(12) United States Patent
Landfors et al.

(10) Patent No.: US 10,304,327 B2
(45) Date of Patent: May 28, 2019

(54) METHOD AND SYSTEM FOR ADJUSTING A SAFETY MARGIN THRESHOLD OF A DRIVER SUPPORT FUNCTION

(71) Applicant: Volvo Car Corporation, Gothenburg (SE)

(72) Inventors: Per Landfors, Hisings Backa (SE); Andrew Backhouse, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 52 days.

(21) Appl. No.: 15/608,458

(22) Filed: May 30, 2017

(65) Prior Publication Data

US 2017/0365165 A1     Dec. 21, 2017

(30) Foreign Application Priority Data

Jun. 20, 2016   (EP) ..................................... 16175195

(51) Int. Cl.
*G08G 1/01*       (2006.01)
*G06F 17/30*      (2006.01)
(Continued)

(52) U.S. Cl.
CPC ........... *G08G 1/012* (2013.01); *B60W 30/095* (2013.01); *B60W 30/12* (2013.01); *B60W 30/14* (2013.01);
(Continued)

(58) Field of Classification Search
CPC ... G08G 1/012; G08G 1/0141; B60W 30/095; B60W 30/14; B60W 50/14; B60W 30/12; B60W 2550/402; B60W 2540/30; B60W 2520/10; B60W 2050/0089; B60W 2520/105; B60W 2550/308;
(Continued)

(56) References Cited

U.S. PATENT DOCUMENTS

2009/0319139 A1*  12/2009  Kondou ................ B60W 10/06
                                                              701/55
2013/0030657 A1*   1/2013  Chatterjee ............. B60W 50/08
                                                              701/46
(Continued)

FOREIGN PATENT DOCUMENTS

WO        2014148989 A1    9/2014

*Primary Examiner* — Brian P Sweeney
(74) *Attorney, Agent, or Firm* — Snyder, Clark, Lesch & Chung, LLP (57) ABSTRACT

A method for adjusting a safety margin threshold of one or more driver support functions of a vehicle, to be suitable for a driving zone in which the vehicle is—or is to be—positioned comprises determining a geographical position of the vehicle, determining a driving zone associated with the vehicle position, which driving zone is selected from one or more pre-defined geographical driving zones, deriving previous statistical driving behaviour data indicative of one or more statistical driving style safety indicators associated with the driving zone, and adjusting a safety margin threshold of at least a first driver support function of the vehicle, based on the one or more statistical driving style safety indicators. The disclosure also relates to a driver support threshold adapting system in accordance with the foregoing, and a vehicle at least partly comprising such a driver support threshold adapting system.

13 Claims, 4 Drawing Sheets

(51) Int. Cl.
 *G09B 19/16* (2006.01)
 *G06F 16/182* (2019.01)
 *B60W 50/14* (2012.01)
 *B60W 30/095* (2012.01)
 *B60W 30/12* (2006.01)
 *B60W 30/14* (2006.01)
 *B60W 50/00* (2006.01)

(52) U.S. Cl.
 CPC ........... *B60W 50/14* (2013.01); *G06F 16/182* (2019.01); *G08G 1/0141* (2013.01); *B60W 2050/0089* (2013.01); *B60W 2520/10* (2013.01); *B60W 2520/105* (2013.01); *B60W 2540/30* (2013.01); *B60W 2550/148* (2013.01); *B60W 2550/308* (2013.01); *B60W 2550/402* (2013.01); *G09B 19/167* (2013.01)

(58) Field of Classification Search
 CPC ........ B60W 2550/148; G06F 17/30194; G06F 16/182; G09B 19/167
 USPC .......................................................... 701/49
 See application file for complete search history.

(56) References Cited

U.S. PATENT DOCUMENTS

2016/0090084 A1  3/2016  Takamatsu et al.
2016/0171521 A1  6/2016  Ramirez et al.

* cited by examiner

METHOD AND SYSTEM FOR ADJUSTING A SAFETY MARGIN THRESHOLD OF A DRIVER SUPPORT FUNCTION

TECHNICAL FIELD

The present disclosure relates to a driver support threshold adapting system for adjusting a safety margin threshold of one or more driver support functions of a vehicle, to be suitable for a driving zone in which said vehicle is—or is to be—positioned.

BACKGROUND

Many vehicles today support a variety of driver support functions, for instance driver assistance functions and/or active safety functions, such as e.g. forward collision warning, distance alert, lane keeping aid, blind spot information, adaptive cruise control, etc. Such driver support functions supplement traditional driver control of the vehicle with one or more warnings or automated actions in appropriate conditions. Since driver support functions serve valuable purposes, it is desirable to tailor said driver support functions to be suitable for the conditions currently at hand.

U.S. Pat. No. 9,014,915, for instance, relates to active safety functionality control for vehicles, and discloses how an active safety functionality provides an action during a drive cycle of the vehicle based on a predetermined threshold. Data pertaining to driving conditions and/or usage conditions of the vehicle is obtained for a drive cycle of the vehicle and a risk factor grade—which corresponds to a level of situational risk for the drive cycle—is calculated using said data. The predetermined threshold of the active safety system is then adjusted based on said risk factor grade.

However, although the approach disclosed in U.S. Pat. No. 9,014,915 accordingly adapts a threshold of the driver support function to be suitable for the conditions currently at hand, it may be desirable to tailor a driver support function in alternative manners.

SUMMARY OF THE INVENTION

It is therefore an object of embodiments herein to provide an approach for in an improved and/or alternative manner adapting a safety margin threshold of a driver support function of a vehicle.

According to a first aspect of embodiments herein, the object is achieved by a method performed by a driver support threshold adapting system for adjusting a safety margin threshold of one or more driver support functions of a vehicle, to be suitable for a driving zone in which the vehicle is—or is to be—positioned. The driver support threshold adapting system determines a geographical position of the vehicle. The driver support threshold adapting system further determines a driving zone associated with the vehicle position, which driving zone is selected from one or more pre-defined geographical driving zones. Moreover, the driver support threshold adapting system derives previous statistical driving behaviour data indicative of one or more statistical driving style safety indicators associated with the driving zone. The driver support threshold adapting system furthermore adjusts a safety margin of at least a first driver support function of the vehicle, based on the one or more statistical driving style safety indicators.

Thereby, an approach is provided which enables vehicle driver support functions to be tailored to be appropriate for a specific current or upcoming driving zone, such as for instance for a specific road segment. That is, since the driver support threshold adapting system determines a geographical position of the vehicle, the location of the vehicle is established. Moreover, since the driver support threshold adapting system then determines a driving zone associated with the vehicle position, which driving zone is selected from one or more pre-defined geographical driving zones, a driving zone deemed relevant for the determined position of said vehicle is selected from a pre-stored set of driving zones. Furthermore, since the driver support threshold adapting system further derives previous statistical driving behaviour data indicative of one or more statistical driving style safety indicators associated with the driving zone, pre-stored data is retrieved indicating how safely said driving zone historically has been driven. The statistical driving behaviour data and subsequently the statistical driving style safety indicators may hence be derived from, relate to and/or refer to various historical safety related input indicating how safely the driving zone has been driven, such as historical acceleration level(s) with respect to road friction information, historical vehicle speed(s) in relation to a current speed limit, historical distance(s) to preceding vehicle(s), historical lateral position(s) in the lane, historical lane keeping(s), historical issuing of one or more collision warnings, historical issuing of one or more lane departure warnings, historical driver distraction levels and/or historical driver drowsiness levels, etc., associated with and/or experienced along at least a section of said driving zone. Moreover, since the driver support threshold adapting system then adjusts a safety margin threshold of at least a first driver support function of the vehicle, based on the one or more statistical driving style safety indicators, one or more thresholds and/or parameters of one or more driver support functions of the vehicle is adapted in view of data indicating how safely the driving zone historically has been driven. Accordingly, driver support functions—such as active safety functions and/or driver assistance functions—utilize the statistical safety related data to adapt different safety margin thresholds to increase the safety and convenience of the vehicle occupants, e.g. the vehicle driver.

For that reason, an approach is provided for in an improved and/or alternative manner adapting a safety margin threshold of a driver support function of a vehicle.

The technical features and corresponding advantages of the above mentioned method will be discussed in further detail in the following.

By introducing a method performed by a driver support threshold adapting system for adjusting a safety margin threshold of one or more driver support functions of a vehicle, to be suitable for a driving zone in which the vehicle is—or is to be—positioned, vehicle driver support functions may be tailored to be appropriate for a specific current or upcoming driving zone, such as for instance for a specific road segment. The expression "driving zone" may refer to "road segment", "stretch of road", "road section comprising one or more road junctions and/or intersections", "drivable area", and furthermore to "geographical driving zone". The "driving zone" may be any zone at least partly intended for vehicle driving, and may be of any shape, width and length, and comprise any arbitrary number of lanes, intersections, cross sections etc. Moreover, the expression of the vehicle being "positioned" may refer to the vehicle being "located" and/or "driving", whereas the expression of the vehicle "is to be positioned" may refer to the vehicle "is to become positioned", "is about to be positioned", "is assumed to further on be positioned", and/or "is estimated to further ahead along its route to be positioned". A current and/or upcoming driving zone may be estimated and/or determined as commonly known in the art, for instance based on a combination of one or more of digital map data, global positioning, direction of travel, prediction of route, learned driving route and selected destination, etc. According to an example, "a driving zone in which the vehicle is—or is to be—positioned" may refer to "a current driving zone and/or an upcoming driving zone". "Vehicle" may refer to any arbitrary vehicle, for instance an engine-propelled vehicle such as e.g. a car, truck, lorry, van, and/or bus. The vehicle may be represented by an at least semi-autonomous vehicle supporting a varying level of automation, e.g. as commonly known a varying level of steering automation and/or a varying level of vehicle speed control automation. Moreover, "vehicle" may refer to "vehicle supporting at least a first driver support function". The expression driver support "function" may throughout this disclosure refer to driver support "system" and/or driver support "feature", whereas the expression "driver support" function throughout may refer to "driver assist" function and/or "active safety" function. As commonly known in the art, "driver assist functions" may relate to safety features designed to assist a driver in routine driving tasks such as monitoring the road environment, safely moderating vehicle speed, and/or maintaining proper lane positioning, whereas "active safety functions" may relate to safety features designed to assist a driver in sudden situations that could pose an immediate threat to drivers and/or vehicle occupants. The expression "safety margin threshold" of a driver support function may refer to a threshold value associated with the driver support function and/or one or more parameters thereof, for instance at which threshold value said driver support function is activated and/or deactivated, and/or on which threshold value said driver support function relies in its implementation. The safety margin threshold may refer to one or more parameters and/or values of arbitrary magnitude, and for instance be expressed in time units such as seconds and/or milliseconds and/or distance units such as meters and/or millimeters. The safety margin threshold may thus indicate for instance a set time gap or distance, e.g. to a preceding vehicle, or indicate a set distance to a nearby e.g. vehicle at which the driver support function associated with the safety margin threshold should be activated. Safety margin "threshold" may refer to safety margin "parameter", and moreover, according to an example, "safety margin threshold of one or more driver support functions" may refer to "safety margin threshold of one or more parameters of one or more driver support functions". The expression of "adjusting" a safety margin threshold may refer do "adapting", "tuning", "refining", "tailoring" and/or "setting" a safety margin threshold, whereas the expression "to be suitable for" a driving zone may refer to "to be appropriate for", "to suit", "to suitably correspond to" and/or "to match" a driving zone. The "driver support threshold adapting system" may fully or at least partly be comprised in, be integrated with and/or be connected to the vehicle, for instance be distributed between one or more vehicle nodes, such as ECUs ("Electronic Control Modules"). Additionally or alternatively, the driver support threshold adapting system may at least partly be comprised in a mobile device integrated with and/or connected to the vehicle, which mobile device for instance may refer to a multi-functional smart phone, mobile phone, mobile terminal or wireless terminal, portable computer such as a laptop, PDA or tablet computer, tablet such as an iPad, Pocket PC, and/or mobile navigation device. The vehicle and/or the optional mobile device may be adapted to have online abilities, as commonly known in the art, for instance to be able to communicate with one or more remote servers such as one or more commonly known "clouds"—also referred to as "automotive clouds"—adapted for cloud-based storage and for wirelessly transmitting data to, and/or receiving data from, vehicles. The one or more clouds may further comprise, be comprised in, be associated with and/or constitute a control system and/or control server(s) adapted to wirelessly communicate with vehicles, remotely control functionality of the vehicles and/or hold information associated with the vehicles; for instance a management and/or assisting system such as e.g. Volvo On Call. Thus, additionally or alternatively, the driver support threshold adapting system may at least partly be comprised in said one or more clouds and/or said control system and/or control server(s). Moreover, the expression "driver" may refer to a human being that is at least partly responsible for controlling the operation and/or movement a vehicle, or a non-human system that is at least partly responsible for controlling the operation and/or movement the vehicle.

Since the driver support threshold adapting system determines a geographical position of the vehicle, the location of the vehicle is established. Determining said geographical position may be accomplished as commonly known in the art, for instance based on digital map data and global positioning, etc. "A geographical position" of the vehicle may refer to "a GPS position", "geographical coordinates" and/or "a horizontal position" of the vehicle, whereas the expression "determining" a geographical position may refer to "deriving", "calculating", "requesting" and/or "receiving" a geographical position. According to an example, "determining a geographical position" of the vehicle optionally comprises "determining a geographical position and a travel direction" of the vehicle. Thereby, by additionally determining a travel direction of the vehicle—which may be accomplished as commonly known in the art—the whereabouts of the vehicle may be established to a greater extent, for instance with regards to towards which driving zone(s) the vehicle might be heading as discussed below.

Since the driver support threshold adapting system further determines a driving zone associated with the vehicle position, which driving zone is selected from one or more pre-defined geographical driving zones, a driving zone deemed relevant for the determined position of said vehicle is selected from a pre-stored set of driving zones. The expression a driving zone "associated with" the vehicle position, may refer to a driving zone "comprising", "comprising or lying ahead of" and/or "comprising or assumed to lie further ahead along a route of the vehicle based on" the vehicle position. "Driving zone" may according to an example refer to "corresponding driving zone", in which case the expression "associated with" the vehicle position may refer to "based on" the vehicle position. "Determining" a driving zone may refer to "deriving" and/or "selecting" a driving zone, whereas "selected from" one or more predefined driving zones may refer to "derived from" one or more pre-defined driving zones. Moreover, "pre-defined" driving zones may refer to "pre-stored" and/or "pre-determined" driving zones, and further to "pre-defined and digitally stored" driving zones, where the storing may take place in one or more memories of the driver support threshold adapting system.

Since the driver support threshold adapting system derives previous statistical driving behaviour data indicative of one or more statistical driving style safety indicators associated with the driving zone, pre-stored data is retrieved indicating how safely said driving zone historically has been driven. The statistical driving behaviour data and subsequently the statistical driving style safety indicators may hence be derived from, relate to and/or refer to various historical safety related input indicating how safely the driving zone has been driven, such as historical acceleration level(s) with respect to road friction information, historical vehicle speed(s) in relation to a current speed limit, historical distance(s) to preceding vehicle(s), historical lateral position(s) in the lane, historical lane keeping(s), historical issuing of one or more collision warnings, historical issuing of one or more lane departure warnings, historical driver distraction levels and/or historical driver drowsiness levels, etc., associated with and/or experienced along at least a section of said driving zone. The statistic(s) relating to the one or more driving style safety indicators may be a mean, a median, a mode a variance, a percentile, a histogram, or any other estimator which describes the statistical properties of the one or more driving style safety indicators. The statistical driving behaviour data and/or the statistical driving style safety indicators may accordingly refer to one or more values of arbitrary magnitudes and/or units. A statistical driving style safety indicator may be expressed as a numerical value, the magnitude of which for instance representing a distance or a time, or a "safety score" determined in view of how safely the driving zone has been driven. For instance, the higher the value and/or level of a specific statistical driving style safety indicator, for instance out of a scale ranging from 1-10, the safer has the driving zone historically been driven in view of that specific statistical driving style safety indicator. According to an example, a first statistical driving style safety indicator—e.g. an "acceleration/friction safety score"—may be determined derived from historical acceleration level(s) with respect to road friction information, a second statistical driving style safety indicator—e.g. a "speed safety score"—may be determined derived from historical vehicle speed(s) in relation to a current speed limit, a third statistical driving style safety indicator—e.g. a "distance safety score"—may be determined derived from historical distance(s) to preceding vehicle(s), etc. "Deriving" previous statistical driving behaviour data may refer to "retrieving", "receiving" and/or "downloading" previous statistical driving behaviour data, whereas "previous" statistical driving behaviour data may refer to "pre-stored" and/or "historical" statistical driving behaviour data. Moreover, "statistical" may throughout this disclosure refer to "historical", "former", "previous" and/or "pre-collected", and "statistical" driving behaviour data further to "sensor-derived statistical" driving behaviour data. The expression "driving behaviour data" may refer to "driving style data" and/or "driving performance data", whereas driving behaviour "data" may refer to driving behaviour "information". The expression data "indicative of" may refer to data "comprising" and/or "representing", whereas the expression statistical driving style safety "indicators" may refer to statistical driving style safety "scores", "values" and/or "indications". Moreover, statistical driving style safety indicators "associated with" the driving zone may refer to statistical driving style safety indicators "valid for" and/or "stored in association with" the driving zone. The storing of the statistical driving behaviour data may take place in one or more memories of the driver support threshold adapting system and/or previously mentioned cloud(s). Furthermore, according to an example, "deriving previous statistical driving behaviour data indicative of one or more statistical driving style safety indicators associated with the driving zone", may refer to "deriving one or more statistical driving style safety indicators derived from previous statistical driving behaviour data associated with the driving zone".

Since the driver support threshold adapting system furthermore adjusts a safety margin threshold of at least a first driver support function of the vehicle, based on the one or more statistical driving style safety indicators, one or more thresholds and/or parameters of one or more driver support functions of the vehicle is adapted in view of data indicating how safely the driving zone historically has been driven. Accordingly, driver support functions—such as active safety functions and/or driver assistance functions—utilize the statistical safety related data to adapt different safety margin thresholds to increase the safety and convenience of the vehicle occupants, e.g. the vehicle driver. That is, driver support functions such as e.g. Adaptive Cruise Control and Distance Alert functions and/or equivalents or successors thereof, may for a specific driving zone have automatic adjustment of their respective e.g. time gap to a preceding vehicle based on said statistical safety related data valid for that driving zone. Thus, if one or more of the statistical driving style safety indicators are below a certain level, an offset may be added to some or all e.g. time gaps—i.e. added to some or all safety margin thresholds—of driver support functions available for the driver and/or supported by the vehicle. Similarly, if in an automatic mode, said e.g. time gap—i.e. safety margin threshold—may be extended in case of one or more of the statistical driving style safety indicators being below a certain level, and vice versa, shortened in case of one or more of the statistical driving style safety indicators being above a certain level. Moreover, similarly, for instance during high autonomous driving, a safety distance margin to other vehicles—hence a safety margin threshold—may be adapted based on one or more of the statistical driving style safety indicators. Furthermore, similarly, driver support functions such as Forward Collision Warning or City Safety functions and/or equivalents or successors thereof, may have their respective activation threshold—i.e. safety margin threshold—automatically adapted based on one or more of the statistical driving style safety indicators; relatively late activation at relative high safety levels of the one or more statistical driving style safety indicators, and vice versa. In a similar manner, driver support functions such as automatic activation driver support functions, e.g. Blind Spot Information System or Lane Keeping Aid and/or equivalents or successors thereof, may accordingly be based on one or more of the statistical driving style safety indicators. The expression "based on" the one or more statistical driving style safety indicators may refer to "in view of", "taking into account", "calculated based on" and/or "derived from" the one or more statistical driving style safety indicators. Moreover, the expression "adjusting a safety margin threshold of at least a first driver support function of said vehicle" may refer to "adjusting a safety margin threshold of at least a first driver support function of said vehicle, prior to arriving at and/or upon entering said driving zone". Furthermore, according to an example, "adjusting a safety margin threshold" may optionally refer to "adjusting a safety margin distance threshold and/or a safety margin time threshold".

Optionally, deriving the previous statistical driving behaviour data may comprise deriving the statistical driving behaviour data from one or more clouds comprising driving behaviour data of vehicles and/or drivers thereof. Thereby, statistical data representing how safely a specific driving zone historically has been driven, may be retrieved from a cloud-based storage in a convenient manner. The one or more "clouds" may refer to the previously discussed one or more clouds, whereas the expression one or more clouds "comprising" driving behaviour data may refer to one or more clouds "holding", "storing", "collecting" and/or "deriving" driving behaviour data. Moreover, the expression driving behaviour data "of" vehicles and/or drivers thereof may refer to driving behaviour data "applicable for", "stored for" and/or "derived and stored for" vehicles and/or drivers thereof.

Optionally, the previous statistical driving behaviour data may comprise driving behaviour data associated with the vehicle, from one or more previous occasions when the vehicle drove within the driving zone. Additionally or alternatively, the previous statistical driving behaviour data may comprise driving behaviour data associated with a driver of the vehicle, from one or more previous occasions when the driver drove within the driving zone. The previous statistical driving behaviour data is then indicative of one or more statistical driving style safety indicators reflecting how safely the vehicle was driven, and/or how safely the vehicle driver drove, within the driving zone on said one or more previous occasions. Thereby, the previous statistical driving behaviour data may be represented by how safely a specific driving zone historically has been driven by the ego vehicle, and/or by one or more drivers thereof. The expression driving behaviour data "associated with" the vehicle and/or the vehicle driver may refer to driving behaviour data "related to" and/or "derived from" the vehicle and/or a profile of the vehicle driver. Moreover, "driving behaviour data associated with" the vehicle and/or the vehicle driver may refer to "driving behaviour data associated with" the vehicle and/or the vehicle driver "derived from vehicle sensors". The expression "previous occasions" may throughout this disclosure refer to suitably selected "former occasions", for instance during when the driver at least to some extent manoeuvred the vehicle, thus at least partly providing input to the driving behaviour data and subsequently the statistical driving style safety indicators. Additionally or alternatively, "occasions" may throughout refer to arbitrarily selected occasions, such as selected at a specific time of day and/or along a specific section of the driving zone, etc. The expression "drove" within the driving zone may throughout this disclosure refer to "was positioned" and/or "was located" within the driving zone. Moreover, the expression "reflecting" how safely may throughout refer to "indicating", "referring to" and/or "comprising" how safely, whereas "how safely" throughout may refer to "at to what safety level", "at what safety score", and/or "how safely—in view of acceleration level(s) with respect to road friction information, vehicle speed(s) in relation to a current speed limit, distance(s) to preceding vehicle(s), lateral position(s) in a lane of the driving zone, lane keeping(s), issuing of collision warning(s), issuing of lane departure warning(s), driver distraction level and/or driver drowsiness levels—associated with and/or experienced along at least a section of said driving zone,".

Optionally, the previous statistical driving behaviour data may comprise driving behaviour data associated with at least one other vehicle and/or associated with at least one other vehicle driver, from one or more previous occasions when the at least one other vehicle and/or the at least one other vehicle driver was positioned within the driving zone. The previous statistical driving behaviour data is then indicative of one or more statistical driving style safety indicators reflecting how safely the at least one other vehicle was driven, and/or how safely the at least one other vehicle driver drove, within the driving zone on the one or more previous occasions. Thereby, the previous statistical driving behaviour data may be represented by how safely a specific driving zone historically has been driven by vehicles other than the ego vehicle, and/or by other vehicle drivers. The expression driving behaviour data "associated with" at least one other vehicle and/or at least one other vehicle driver may refer to driving behaviour data "related to" and/or "derived from" at least one other vehicle and/or a profile of one other driver. Moreover, "driving behaviour data associated with" at least one other vehicle may refer to "driving behaviour data associated with" at least one other vehicle and/or other vehicle driver "derived from vehicle sensors".

Optionally, the previous statistical driving behaviour data and/or the driving behaviour data may be based on a vehicle acceleration level with respect to road friction information, a vehicle speed in relation to a current speed limit, a distance to another vehicle ahead, a vehicle lateral lane position, a vehicle lane keeping, an issuing of one or more vehicle collision warnings, a vehicle driver distraction level, and/or a vehicle driver drowsiness level. Thereby, by deriving the statistical driving behaviour data and/or the optional driving behaviour data—and subsequently the statistical driving style safety indicators—from the historical information and/or data stated above, it may hence be established how safely the driving zone has been driven historically. The expression of data being "based on" may refer to data being "derived from" and/or "calculated based on".

Optionally, the first driver support function may be selected from the group consisting of Adaptive Cruise Control, Distance Alert, Forward Collision Warning, City Safety, Blind Spot Information, and/or Lane Keeping Aid, and/or an equivalent or successor thereof. Thereby, by adjusting the safety margin threshold of at least one of said driver support functions based on the one or more statistical driving style safety indicators, along at least a portion of the driving zone, the safety and convenience of the vehicle occupant(s)—e.g. the vehicle driver—may be increased.

Optionally, the one or more statistical driving style safety indicators may be represented by a statistical average driving style safety indicator. Thereby, the statistical driving behaviour data derived, may be indicative of a statistical average driving style safety indicator—in the following referred to as a "statistical safety score"—associated with the driving zone. Consequently, safety margin thresholds of one or more driver support functions may be adjusted based on said statistical safety score. The statistical safety score, which further may be referred to as a "long-term" and or "fused" statistical safety score, may be represented by a single value, e.g. numerical value, indicating a level of how safely the driving zone historically has been driven. For instance, the higher the value and/or level of the statistical safety score, for instance out of a scale ranging from 1-10, the safer has the driving zone historically been driven. The statistical safety score for said driving zone may be determined based on fusing a variety of historical input data relating to how safely the driving zone historically has been driven, such as historical acceleration level(s) with respect to road friction information, historical vehicle speed(s) in relation to a current speed limit, historical distance(s) to preceding vehicle(s), historical lateral position(s) in the lane, historical lane keeping(s), historical issuing of one or more collision warnings, historical issuing of one or more lane departure warnings, historical driver distraction levels and/or historical driver drowsiness levels etc., associated with and/or experienced along at least a section of said driving zone. The input fused into the statistical safety score may be arbitrarily selected and/or weighted as considered e.g.

appropriate and/or feasible. The expression of the one or more statistical driving style safety indicators "being represented by" a statistical average driving style safety indicator, may refer to the one or more statistical driving style safety indicators "being fused into" and/or "comprising" a statistical average driving style safety indicator.

According to an example, the driver support threshold adapting system may further optionally enable at least one of the one or more statistical driving style safety indicators and/or the statistical average driving style safety indicator to be presented orally and/or visually within the vehicle. Thereby, at least one of the one or more statistical driving style safety indicators and/or the so called statistical safety score may be presented within the vehicle, for instance by means of one or more displays, such as an infotainment display, a display integrated with the dashboard, a head-up display and/or display of a mobile device in connection with the vehicle and/or the driver support threshold adapting system. Additionally or alternatively, at least one of the one or more statistical driving style safety indicators and/or the so called statistical safety score may be presented within the vehicle, for instance by means of one or more loudspeakers, such as a loudspeaker integrated with the vehicle and/or a loudspeaker of a mobile device in connection with the vehicle and/or the driver support threshold adapting system. The expression "enabling" may here refer to "initiating" and/or "supporting".

According to a second aspect of embodiment herein, the object is achieved by a driver support threshold adapting system adapted for adjusting a safety margin threshold of one or more driver support functions of a vehicle, to be suitable for a driving zone in which the vehicle is—or is to be—positioned. The driver support threshold adapting system comprises a position determining unit adapted for determining a geographical position of the vehicle. The driver support threshold adapting system moreover comprises a driving zone determining unit adapted for determining a driving zone associated with the vehicle position, which driving zone is selected from one or more pre-defined geographical driving zones. Furthermore, the driver support threshold adapting system comprises a statistical data deriving unit adapted for deriving previous statistical driving behaviour data indicative of one or more statistical driving style safety indicators associated with the driving zone. The driver support threshold adapting system further comprises a threshold adjusting unit adapted for adjusting a safety margin threshold of at least a first driver support function of the vehicle, based on the one or more statistical driving style safety indicators.

Optionally, the statistical data deriving unit may be adapted for deriving the statistical driving behaviour data from one or more clouds comprising driving behaviour data of vehicles and/or drivers thereof.

Furthermore, optionally, the previous statistical driving behaviour data may comprise driving behaviour data associated with the vehicle from one or more previous occasions when the vehicle drove within the driving zone, and/or driving behaviour data associated with a driver of the vehicle from one or more previous occasions when the driver drove within the driving zone. The previous statistical driving behaviour data is then indicative of one or more statistical driving style safety indicators reflecting how safely the vehicle was driven, and/or how safely the vehicle driver drove, within the driving zone on the one or more previous occasions. Additionally or alternatively, optionally, the previous statistical driving behaviour data may comprise driving behaviour data associated with at least one other vehicle and/or associated with at least one other vehicle driver, from one or more previous occasions when the at least one other vehicle and/or the at least one other vehicle driver was positioned within the driving zone. The previous statistical driving behaviour data is then indicative of one or more statistical driving style safety indicators reflecting how safely the at least one other vehicle was driven, and/or how safely the at least one other vehicle driver drove, within the driving zone on the one or more previous occasions. Optionally, the previous statistical driving behaviour data and/or the driving behaviour data may be based on one or more of a vehicle acceleration level with respect to road friction information, a vehicle speed in relation to a current speed limit, a distance to another vehicle ahead, a vehicle lateral lane position, a vehicle lane keeping, an issuing of one or more vehicle collision warnings, a vehicle driver distraction level, and/or a vehicle driver drowsiness level. Moreover, optionally, the first driver support function may be selected from the group consisting of Adaptive Cruise Control, Distance Alert, Forward Collision Warning, City Safety, Blind Spot Information and Lane Keeping Aid, or an equivalent or successor thereof. Furthermore, optionally, the one or more statistical driving style safety indicators may be represented by a statistical average driving style safety indicator. According to an example, the driver support threshold adapting system may further optionally comprise a presentation enabling unit adapted for enabling at least one of the one or more statistical driving style safety indicators and/or the statistical average driving style safety indicator to be presented orally and/or visually within the vehicle, for instance by means of one or more displays and/or one or more loudspeakers.

Similar advantages as those mentioned in the foregoing in relation to the first aspect correspondingly apply to the second aspect, which is why these advantages are not further discussed.

According to a third aspect of embodiments herein, the object is achieved by a vehicle comprising at least a portion—such as the position determining unit, the driving zone determining unit, the statistical data deriving unit and/or the threshold adjusting unit—of a driver support threshold adapting system discussed above. The vehicle supports at least a first driver support function. Again, similar advantages as those mentioned in the foregoing in relation to the first aspect correspondingly apply to the third aspect, which is why these advantages are not further discussed.

According to a fourth aspect of embodiments herein, the object is achieved by a computer program product comprising a computer program containing computer program code means arranged to cause a computer or a processor to execute the steps of the driver support threshold adapting system discussed above, stored on a computer-readable medium or a carrier wave. Yet again, similar advantages as those mentioned in the foregoing in relation to the first aspect correspondingly apply to the fourth aspect, which is why these advantages are not further discussed.

BRIEF DESCRIPTION OF THE DRAWINGS

The various aspects of the non-limiting embodiments of the invention, including particular features and advantages, will be readily understood from the following detailed description and the accompanying drawings, in which.

DETAILED DESCRIPTION

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to adjusting a safety margin threshold of one or more driver support functions of a vehicle, to be suitable for a driving zone in which the vehicle is—or is to be—positioned, there will be disclosed an approach which enables vehicle driver support functions to be tailored to be appropriate for a specific current or upcoming driving zone, such as for instance for a specific road segment.

Figure 1:
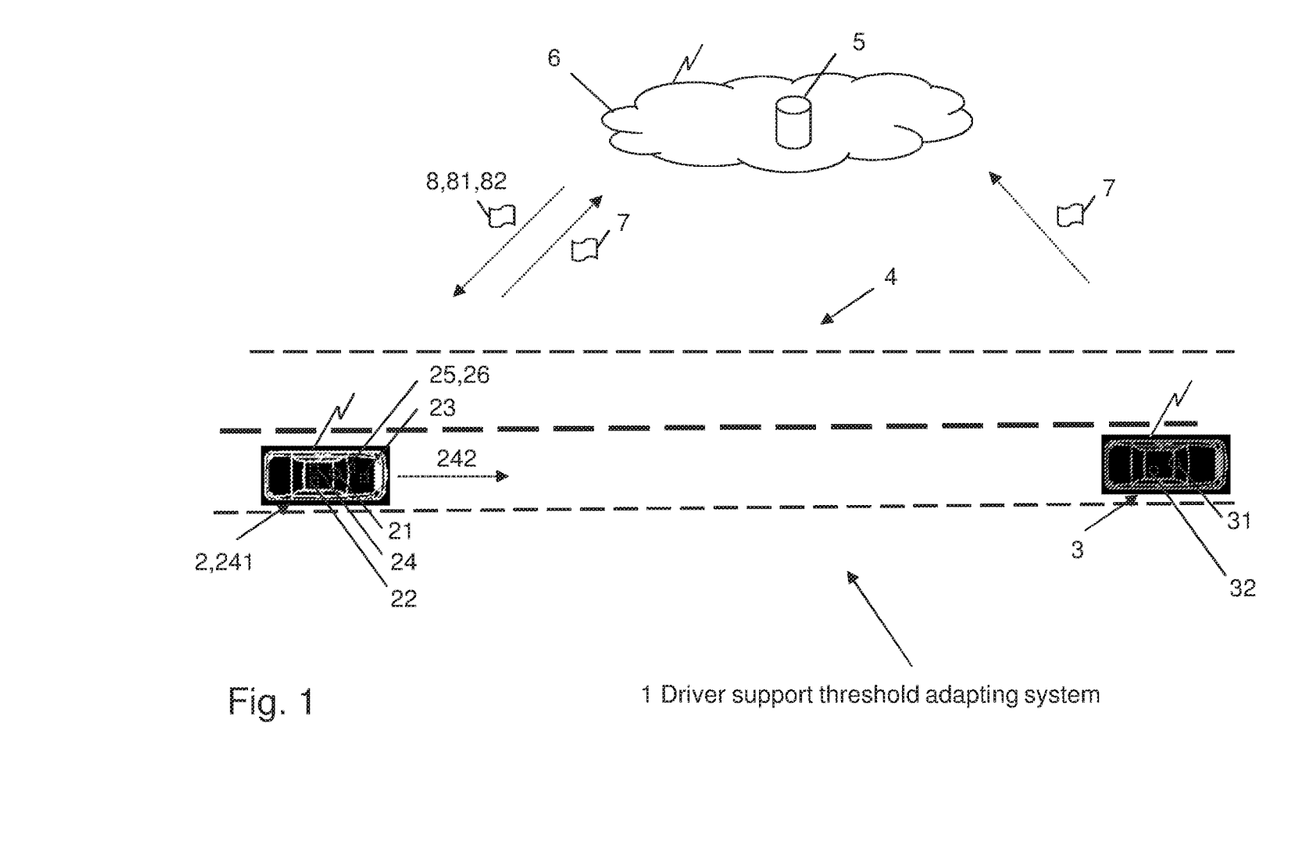
FIG. 1 illustrates a schematic overview of an exemplifying driver support threshold adapting system according to embodiments of the disclosure.

Referring now to the figures and FIG. 1 in particular, there is illustrated a schematic overview of an exemplifying driver support threshold adapting system 1 according to embodiments of the disclosure. The driver support threshold adapting system 1 may at least partly be comprised in a vehicle 2. The vehicle 2—on-board which there may be an optional driver 21—may comprise and/or be connected to one or more commonly known vehicle sensors 22. The vehicle 2 supports at least a first driver support function 23, which for instance may be implemented by means of a commonly known driver support system. The at least first driver support function 23 may for instance refer to Adaptive Cruise Control, Distance Alert, Forward Collision Warning, City Safety, Blind Spot Information and/or Lane Keeping Aid, or an equivalent or successor thereof. The vehicle 2 is in the shown embodiment at an exemplifying geographical position 241, for instance determined by means of a commonly known positioning system 24, traveling in an optional travel direction 242. The vehicle 2 may further optionally comprise and/or be connected to one or more of a digital display 25 and/or a loudspeaker 26.

Further shown in the exemplifying embodiment is an optional other vehicle 3, which may carry on-board an optional other vehicle driver 31, and/or further comprise and/or be connected to one or more other vehicle sensors 32 which sensors 32 may be commonly known in the art.

Yet further shown in FIG. 1 is an exemplifying driving zone 4, here represented by a road section, which driving zone 4 is associated with the vehicle position 241. The driving zone 4 is one out of one or more pre-defined geographical driving zones 5. The pre-defined geographical driving zones 5 may for instance be comprised in one or more optional clouds 6, which may be referred to as automotive clouds. Said one or more clouds 6 may further comprise driving behaviour data 7 of vehicles 2, 3 and/or drivers 21, 31 thereof.

Also illustrated in the exemplifying embodiment is previous statistical driving behaviour data 8 indicative of one or more statistical driving style safety indicators 81 associated with the driving zone 4. Optionally, the one or more statistical driving style safety indicators may be represented by a statistical average driving style safety indicator 82, also herein referred to as a statistical safety score. The driving behaviour data 7, the previous statistical driving behaviour data 8, the statistical driving style safety indicators 81 and the optional statistical safety score 82 will be described in further detail in conjunction with FIG. 3.

Figure 2:
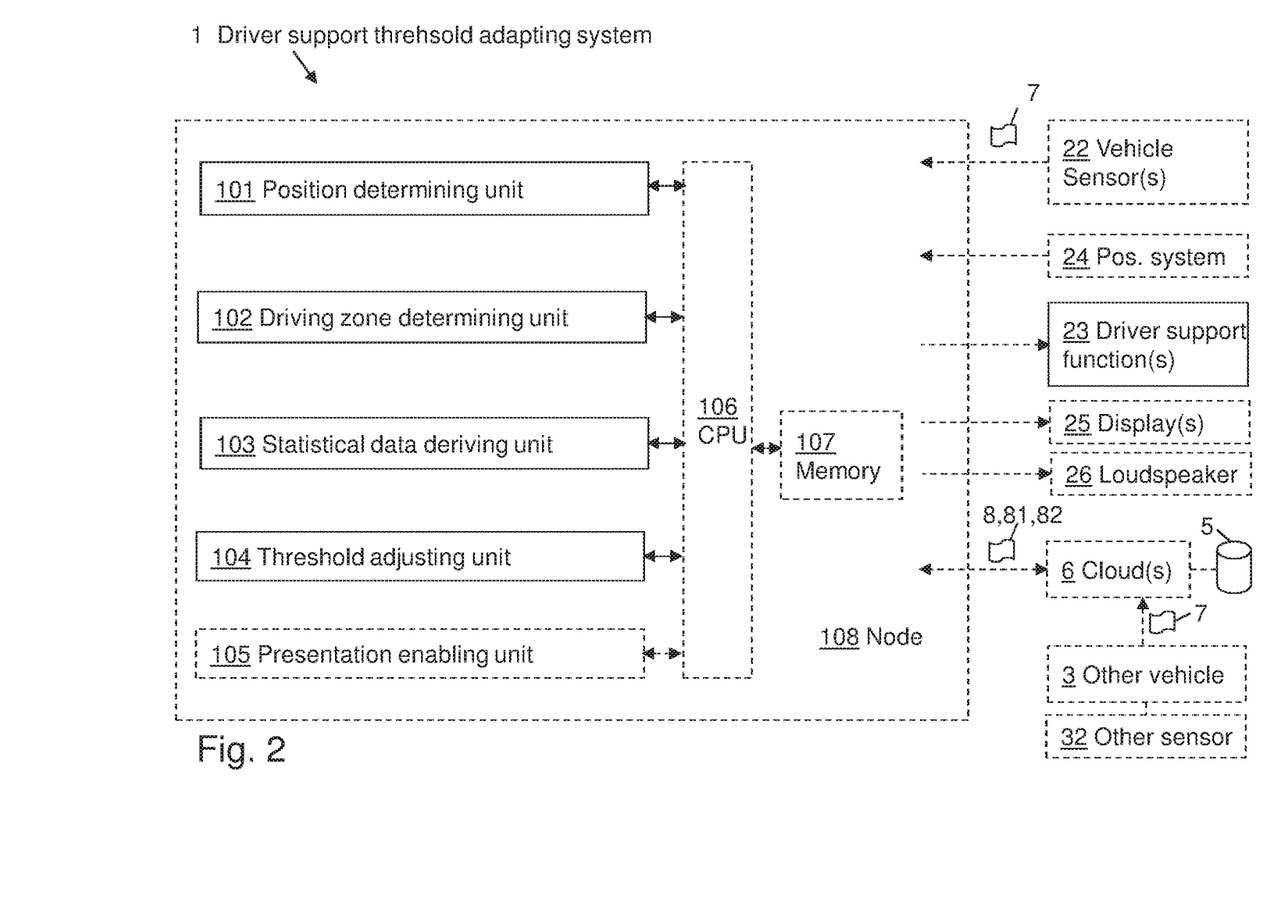
FIG. 2 is a schematic block diagram illustrating an exemplifying driver support threshold adapting system according to embodiments of the disclosure.
Figure 3:
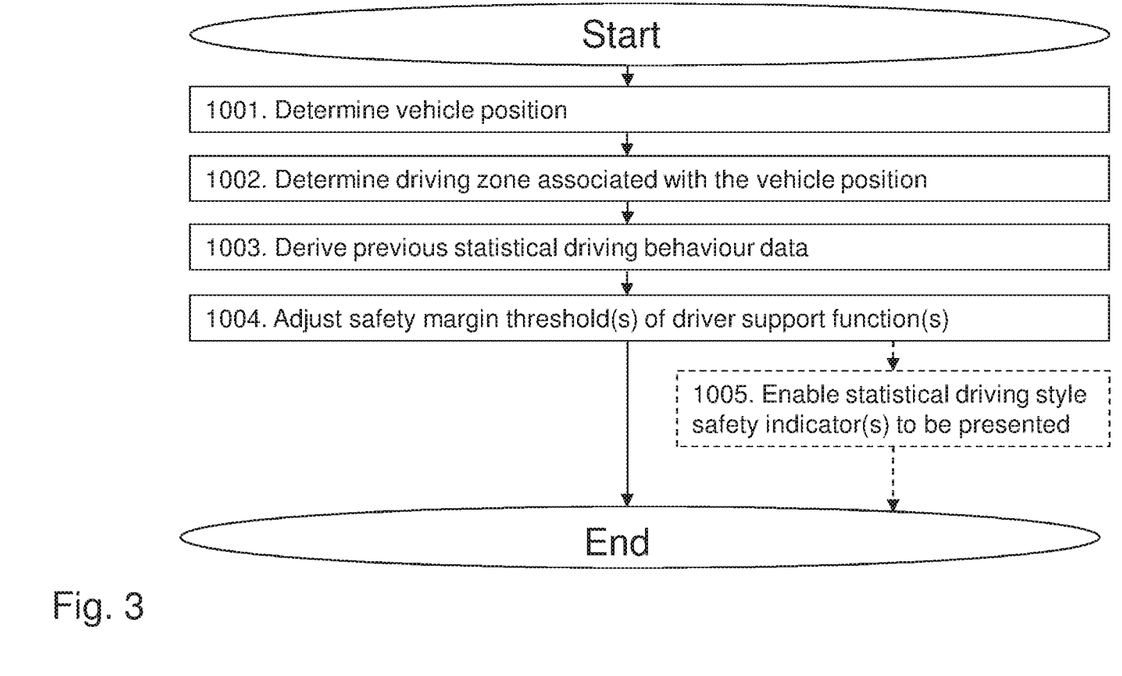
FIG. 3 is a flowchart depicting an exemplifying method for adjusting a safety margin threshold of one or more driver support functions of a vehicle, to be suitable for a driving zone in which the vehicle is—or is to be—positioned, according to embodiments of the disclosure.

As further shown in FIG. 2, which depicts a schematic block diagram illustrating an exemplifying driver support threshold adapting system 1 according to embodiments of the disclosure, the driver support threshold adapting system 1 comprises a position determining unit 101, a driving zone determining unit 102, a statistical data deriving unit 103, a threshold adjusting unit 104 and an optional presentation enabling unit 105, all of which be described in greater detail in conjunction with FIG. 3.

Furthermore, the embodiments herein for adjusting a safety margin threshold of one or more driver support functions 23 of the vehicle 2, to be suitable for the driving zone 4 in which the vehicle 2 is—or is to be—positioned, may be implemented through one or more processors, such as a processor 106, here denoted CPU, together with computer program code for performing the functions and actions of the embodiments herein. Said program code may also be provided as a computer program product, for instance in the form of a data carrier carrying computer program code for performing the embodiments herein when being loaded into the driver support threshold adapting system 1. One such carrier may be in the form of a CD ROM disc. It is however feasible with other data carriers such as a memory stick. The computer program code may furthermore be provided as pure program code on a server and downloaded to the driver support threshold adapting system 1.

The driver support threshold adapting system 1 may further comprise a memory 107 comprising one or more memory units. The memory 107 may be arranged to be used to store e.g., information, and further to store data, configurations, schedulings, and applications, to perform the methods herein when being executed in the driver support threshold adapting system 1. Furthermore, the position determining unit 101, the driving zone determining unit 102, the statistical data deriving unit 103, the threshold adjusting unit 104, the optional presentation enabling unit 105, the optional processor 106 and/or the optional memory 107 may for instance at least partly be implemented in one or more vehicle nodes 108 of the vehicle 2. According to an alternative example, the driver support threshold adapting system 1 may be represented by a plug-in solution, such that the driver support threshold adapting system 1 at least partly is implemented on for instance a dongle. In that manner, an aftermarket solution may be provided. Those skilled in the art will also appreciate that the position determining unit 101, the driving zone determining unit 102, the statistical data deriving unit 103, the threshold adjusting unit 104 and/or the optional presentation enabling unit 105 described above, and which will be described in more detail later on in this description, may refer to a combination of analog and digital circuits, and/or one or more processors configured with software and/or firmware, e.g. stored in a memory such as the memory 107, that when executed by the one or more processors such as the processor 106 perform as will be described in more detail later on. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

FIG. 3 is a flowchart depicting an exemplifying method for adjusting a safety margin threshold of one or more driver support functions 23 of a vehicle 2, to be suitable for a driving zone 4 in which the vehicle 2 is—or is to be—positioned, according to embodiments of the disclosure. The method is performed by the driver support threshold adapting system 1. The exemplifying method, which may be continuously repeated, comprises the following actions discussed with support from FIGS. 1 and 2. The actions may be taken in any suitable order, for instance may Action 1004 and optional Action 1005 be performed simultaneously and/or in an alternate order.

In Action 1001, the driver support threshold adapting system 1 determines the geographical position 241 of the vehicle 2. Correspondingly, the position determining unit 101 is adapted for determining the geographical position 241 of the vehicle 2. Thus, as shown with support from FIGS. 1 and 2, the location 241 of the vehicle 2 is established, e.g. by means of the positioning system 24.

In Action 1002, the driver support threshold adapting system 1 determines the driving zone 4 associated with the vehicle position 241. Correspondingly, the driving zone determining unit is adapted for determining the driving zone 4 associated with the vehicle position 241. The driving zone 4 is selected from the one or more pre-defined geographical driving zones 5. Thus, as shown with support from FIGS. 1 and 2, a driving zone 4 deemed relevant for the determined position 241 of said vehicle 2, is selected from a pre-stored set of driving zones 5.

In Action 1003, the driver support threshold adapting system 1 derives previous statistical driving behaviour data 8 indicative of one or more statistical driving style safety indicators 81 associated with the driving zone 4. Correspondingly, the statistical data deriving unit is adapted for deriving previous statistical driving behaviour data 8 indicative of one or more statistical driving style safety indicators 81 associated with the driving zone 4. Thus, as shown with support from FIGS. 1 and 2, pre-stored data 8, 81 is retrieved indicating how safely said driving zone 4 historically has been driven.

Optionally, deriving previous statistical driving behaviour data 8 may comprise deriving the statistical driving behaviour data 8 from one or more clouds 6, which one or more clouds 6 comprises driving behaviour data 7 of vehicles 2, 3 and/or drivers thereof 21, 31. Correspondingly, the statistical data deriving unit 103 may be adapted for deriving the statistical driving behaviour data 8 from one or more clouds 6, which one or more clouds 6 comprises driving behaviour data 7 of vehicles 2, 3 and/or drivers thereof 21, 31. Thus, as shown with support from FIGS. 1 and 2, statistical data 8, 81 representing how safely a specific driving zone 4 historically has been driven, may be retrieved from a cloud-based storage 6 in a convenient manner.

Optionally, the previous statistical driving behaviour data 8 may comprise driving behaviour data 7 associated with the vehicle 2 from one or more previous occasions when the vehicle 2 drove within the driving zone 4, and/or driving behaviour data 7 associated with the driver 21 of the vehicle 2, from one or more previous occasions when the driver 21 drove within the driving zone 4. The previous statistical driving behaviour data 8 is then indicative of one or more statistical driving style safety indicators 81 reflecting how safely the vehicle 2 was driven, and/or how safely the vehicle driver 21 drove, within the driving zone 4 on the one or more previous occasions. Thus, as shown with support from FIGS. 1 and 2, the previous statistical driving behaviour data 8 may then be represented by how safely a specific driving zone 4 historically has been driven by the ego vehicle 2, and/or by one or more drivers 21 thereof.

Additionally or alternatively, optionally, the previous statistical driving behaviour data 8 may comprise driving behaviour data 7 associated with at least one other vehicle 3 and/or associated with at least one other vehicle driver 31, from one or more previous occasions when the at least one other vehicle 3 and/or the at least one other vehicle driver 31 was positioned within the driving zone 4. The previous statistical driving behaviour data 8 is then indicative of one or more statistical driving style safety indicators 81 reflecting how safely the at least one other vehicle 3 was driven, and/or how safely the at least one other vehicle driver 31 drove, within the driving zone 4 on the one or more previous occasions. Thus, as shown with support from FIGS. 1 and 2, the previous statistical driving behaviour data 8 may then be represented by how safely a specific driving zone 4 historically has been driven by vehicles 3 other than the ego vehicle 2, and/or by other vehicle drivers 31.

Optionally, the previous statistical driving behaviour data 8 and/or the driving behaviour data 7 is based on one or more of a vehicle acceleration level with respect to road friction information, a vehicle speed in relation to a current speed limit, a distance to another vehicle ahead, a vehicle lateral lane position, a vehicle lane keeping, an issuing of one or more vehicle collision warnings, a vehicle driver distraction level, and/or a vehicle driver drowsiness level. Thus, as shown with support from FIGS. 1 and 2, the statistical driving behaviour data 8 and subsequently the statistical driving style safety indicators 81 may hence be derived from, relate to and/or refer to various historical safety related input indicating how safely the driving zone has been driven, such as historical acceleration level(s) with respect to road friction information, historical vehicle speed(s) in relation to a current speed limit, historical distance(s) to preceding vehicle(s), historical lateral position(s) in the lane, historical lane keeping(s), historical issuing of one or more collision warnings, historical issuing of one or more lane departure warnings, historical driver distraction levels and/or historical driver drowsiness levels, etc., associated with and/or experienced along at least a section of said driving zone 4.

Furthermore, optionally, the one or more statistical driving style safety indicators 81 may be represented by a statistical average driving style safety indicator 82. Thus, as shown with support from FIGS. 1 and 2, the statistical driving behaviour data 8 derived, may be indicative of a statistical average driving style safety indicator 82—also referred to as a "statistical safety score"—associated with the driving zone 4. The statistical safety score 82 for said driving zone 4 may be determined based on fusing a variety of historical input data 80, 81 relating to how safely the driving zone 4 historically has been driven, such as historical acceleration level(s) with respect to road friction information, historical vehicle speed(s) in relation to a current speed limit, historical distance(s) to preceding vehicle(s), historical lateral position(s) in the lane, historical lane keeping(s), historical issuing of one or more collision warnings, historical issuing of one or more lane departure warnings, historical driver distraction levels and/or historical driver drowsiness levels etc., associated with and/or experienced along at least a section of said driving zone 4.

Returning to FIG. 3, in Action 1004, the driver support threshold adapting system 1 adjusts a safety margin threshold of at least a first driver support function 23 of the vehicle 2, based on the one or more statistical driving style safety indicators 81. Correspondingly, the threshold adapting unit 104 is adapted for adjusting a safety margin threshold of at least a first driver support function 23 of the vehicle 2, based on the one or more statistical driving style safety indicators 81. Thus, as shown with support from FIGS. 1 and 2, one or more thresholds and/or parameters of one or more driver support functions 23 of the vehicle 2 is adapted in view of data 81 indicating how safely the driving zone 4 historically has been driven. Accordingly, driver support functions 23—such as active safety functions and/or driver assistance functions—utilize the statistical safety related data 81 to adapt different safety margin thresholds to increase the safety and convenience of the vehicle occupants, e.g. the vehicle driver 21. Optionally, the safety margin thresholds of one or more driver support functions 23 may be adjusted based on the optional statistical safety score 82.

Furthermore, optionally, the first driver support function 23 may represented by Adaptive Cruise Control, Distance Alert, Forward Collision Warning, City Safety, Blind Spot Information, and/or Lane Keeping Aid, and/or an equivalent or successor thereof. Thus, as shown with support from FIGS. 1 and 2, by adjusting the safety margin threshold of at least one of said driver support functions 23 listed above based on the one or more statistical driving style safety indicators 81, along at least a portion of the driving zone 4, the safety and convenience of the vehicle occupant(s)—e.g. the vehicle driver 21—may be increased.

In optional Action 1005, the driver support threshold adapting system 1 may further optionally enable at least one of the one or more statistical driving style safety indicators 81 and/or the statistical average driving style safety indicator 82 to be presented orally and/or visually within the vehicle 2. Correspondingly, the optional presentation enabling unit 105 may be adapted for enabling at least one of the one or more statistical driving style safety indicators 81 and/or the statistical average driving style safety indicator 82 to be presented orally and/or visually within the vehicle 2. Thus, as shown with support from FIGS. 1 and 2, at least one of the one or more statistical driving style safety indicators 81 and/or the so called statistical safety score 82 may be presented within the vehicle 2, for instance by means of one or more displays 25, such as an infotainment display, a display integrated with the dashboard, a head-up display and/or display of a mobile device in connection with the vehicle 2 and/or the driver support threshold adapting system 1. Additionally or alternatively, at least one of the one or more statistical driving style safety indicators 81 and/or the so called statistical safety score 82 may be presented within the vehicle 2, for instance by means of one or more loudspeakers 26, such as a loudspeaker integrated with the vehicle 2 and/or a loudspeaker of a mobile device in connection with the vehicle 2 and/or the driver support threshold adapting system 1.

Figure 4:
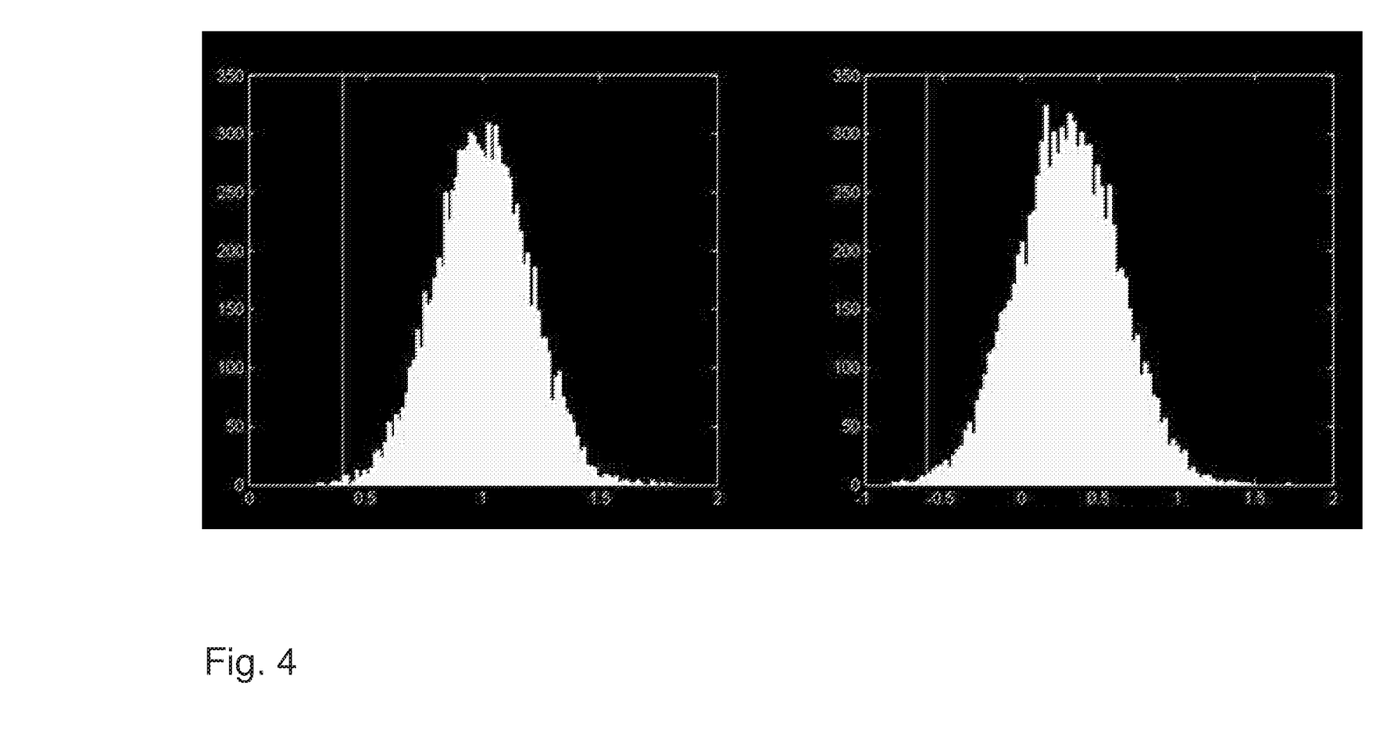
FIG. 4 illustrates exemplifying lane keeping histograms according to embodiments of the disclosure.

FIG. 4 illustrates exemplifying lane keeping histograms according to embodiments of the disclosure. The lane keeping histograms, which here are comprised in the automotive cloud(s) 6, comprise uploaded and/or derived statistics of how vehicles 3 historically have been driven—and/or how vehicle drivers 31 historically have been driving—along specific driving zones. The histograms respectively comprise statistic lateral distances kept to the lane marker relative the vehicles 3; here to left lane marker for vehicles 3 driving on the right-hand side of the road. Accordingly, respective y axis represents frequency, such as the number of vehicles 3 from which driving behavior data has been derived, whereas respective x axis represents lateral distance to the left lane marker. The exemplifying histogram to the left in FIG. 4 is associated with a wide straight road, such as the driving zone 4 exemplified in FIG. 1, whereas the exemplifying histogram to the right in FIG. 4 is associated with a driving zone comprising a narrow road with tight corners.

According to an exemplifying scenario, where the vehicle 2 enters—or is about to enter—a specific driving zone, a value—such as a statistical driving style safety indicator—indicative of how e.g. the 0.1% driving closest to the left lane marker for that driving zone, is derived from the cloud(s). Thus, in case of the histogram to the left in FIG. 4, the exemplifying value 0.4 is derived, and in case of the histogram to the right, the exemplifying value −0.6 is derived. The safety margin threshold may then be adjusted based on the respective values 0.4 and −0.6 for respective driving zone, and the driver support function "lane keeping aid" may accordingly be initiated based thereon, thus when the vehicle 2 drives close to the left lane marker as compared to other statistical vehicles 3. Additionally or alternatively, a mean value or variance or other type of statistical value relevant for adjusting the safety margin threshold, may be derived.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

What is claimed is:

1. A method performed by a driver support threshold adapting system for adjusting a safety margin threshold of one or more driver support functions of a vehicle, to be suitable for a driving zone in which said vehicle is, or is to be, positioned, said method comprising:
   determining a geographical position of said vehicle;
   determining a driving zone associated with said vehicle position, said driving zone being selected from one or more pre-defined geographical driving zones;
   deriving previous statistical driving behaviour data indicative of one or more statistical driving style safety indicators associated with said driving zone,
   wherein said previous statistical driving behaviour data comprises:
      driving behaviour data associated with at least one other vehicle and/or associated with at least one other vehicle driver, from one or more previous occasions when said at least one other vehicle and/or said at least one other vehicle driver was positioned within said driving zone,
      said previous statistical driving behaviour data then being indicative of one or more statistical driving style safety indicators reflecting how safely said at least one other vehicle was driven, and/or how safely said at least one other vehicle driver drove, within said driving zone on said one or more previous occasions; and adjusting a safety margin threshold of at least a first driver support function of said vehicle, based on said one or more statistical driving style safety indicators.

2. The method according to claim 1, wherein said deriving previous statistical driving behaviour data comprises deriving said statistical driving behaviour data from one or more clouds comprising driving behaviour data of vehicles and/or drivers thereof.

3. The method according to claim 1, wherein said previous statistical driving behaviour data comprises:
   driving behaviour data associated with said vehicle, from one or more previous occasions when said vehicle drove within said driving zone; and/or
   driving behaviour data associated with a driver of said vehicle, from one or more previous occasions when said driver drove within said driving zone,
   said previous statistical driving behaviour data then being indicative of one or more statistical driving style safety indicators reflecting how safely said vehicle was driven, and/or how safely said vehicle driver drove, within said driving zone on said one or more previous occasions.

4. The method according to claim 1, wherein said previous statistical driving behaviour data is based on one or more of: a vehicle acceleration level with respect to road friction information; a vehicle speed in relation to a current speed limit; a distance to another vehicle ahead; a vehicle lateral lane position; a vehicle lane keeping; an issuing of one or more vehicle collision warnings; a vehicle driver distraction level; and/or a vehicle driver drowsiness level.

5. The method according to claim 1, wherein said first driver support function is selected from the group consisting of: Adaptive Cruise Control, Distance Alert, Forward Collision Warning, City Safety, Blind Spot Information, and Lane Keeping Aid, or an equivalent or successor thereof.

6. The method according to claims 1, wherein said one or more statistical driving style safety indicators are represented by a statistical average driving style safety indicator.

7. A driver support threshold adapting system adapted for adjusting a safety margin threshold of one or more driver support functions of a vehicle, to be suitable for a driving zone in which said vehicle is, or is to be, positioned, said driver support threshold adapting system comprising:
   a position determining unit adapted for determining a geographical position of said vehicle;
   a driving zone determining unit adapted for determining a driving zone associated with said vehicle position, said driving zone being selected from one or more pre-defined geographical driving zones;
   a statistical data deriving unit adapted for deriving previous statistical driving behaviour data indicative of one or more statistical driving style safety indicators associated with said driving zone,
   wherein said previous statistical driving behaviour data comprises:
      driving behaviour data associated with at least one other vehicle and/or associated with at least one other vehicle driver, from one or more previous occasions when said at least one other vehicle and/or said at least one other vehicle driver was positioned within said driving zone,
      said previous statistical driving behaviour data then being indicative of one or more statistical driving style safety indicators reflecting how safely said at least one other vehicle was driven, and/or how safely said at least one other vehicle driver drove, within said driving zone on said one or more previous occasions; and
   a threshold adjusting unit adapted for adjusting a safety margin threshold of at least a first driver support function of said vehicle, based on said one or more statistical driving style safety indicators.

8. The driver support threshold adapting system according to claim 7, wherein said statistical data deriving unit is adapted for deriving said statistical driving behaviour data from one or more clouds comprising driving behaviour data of vehicles and/or drivers thereof.

9. The driver support threshold adapting system according to claim 7, wherein said previous statistical driving behaviour data comprises:
   driving behaviour data associated with said vehicle, from one or more previous occasions when said vehicle drove within said driving zone; and/or
   driving behaviour data associated with a driver of said vehicle, from one or more previous occasions when said driver drove within said driving zone,
   said previous statistical driving behaviour data then being indicative of one or more statistical driving style safety indicators reflecting how safely said vehicle was driven, and/or how safely said vehicle driver drove, within said driving zone on said one or more previous occasions.

10. The driver support threshold adapting system according to claim 7, wherein said previous statistical driving behaviour data is based on one or more of:
   a vehicle acceleration level with respect to road friction information;
   a vehicle speed in relation to a current speed limit;
   a distance to another vehicle ahead;
   a vehicle lateral lane position;
   a vehicle lane keeping;
   an issuing of one or more vehicle collision warnings;
   a vehicle driver distraction level; and/or
   a vehicle driver drowsiness level.

11. The driver support threshold adapting system according to claim 7, wherein said first driver support function is selected from the group consisting of: Adaptive Cruise Control, Distance Alert, Forward Collision Warning, City Safety, Blind Spot Information, and Lane Keeping Aid, or an equivalent or successor thereof.

12. The driver support threshold adapting system according to claim 7, wherein said one or more statistical driving style safety indicators are represented by a statistical average driving style safety indicator.

13. A vehicle comprising the driver support threshold adapting system according to claim 7, said vehicle supporting at least a first driver support function.

* * * * *